(12) United States Patent
Hokada et al.

(10) Patent No.: US 11,054,195 B2
(45) Date of Patent: Jul. 6, 2021

(54) HEAT EXCHANGER AND MANUFACTURING METHOD THEREFOR

(71) Applicant: NORITZ CORPORATION, Hyogo (JP)

(72) Inventors: Yoshinori Hokada, Kobe (JP); Gaku Sato, Kobe (JP); Hideyuki Fujisawa, Kobe (JP); Yukiko Kashima, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 59 days.

(21) Appl. No.: 16/578,429

(22) Filed: Sep. 23, 2019

(65) Prior Publication Data

US 2020/0103182 A1 Apr. 2, 2020

(30) Foreign Application Priority Data

Sep. 27, 2018 (JP) .............................. JP2018-181272

(51) Int. Cl.
| | |
|---|---|
| F28F 1/00 | (2006.01) |
| F28F 9/00 | (2006.01) |
| F28F 9/02 | (2006.01) |
| F28D 1/047 | (2006.01) |

(52) U.S. Cl.
CPC ............ *F28F 9/001* (2013.01); *F28D 1/0477* (2013.01); *F28F 9/0246* (2013.01); *F28F 2009/0285* (2013.01)

(58) Field of Classification Search
CPC .. F28F 9/001; F28F 9/002; F28F 9/005; F28F 9/0219; F28F 9/0231; F28F 9/0248; F28F 9/18; F28F 9/0246; F28D 1/0477

USPC ......................................................... 165/177
See application file for complete search history.

(56) References Cited

U.S. PATENT DOCUMENTS

| 5,054,549 A | * | 10/1991 | Nakaguro ................ F28F 19/06 165/133 |
|---|---|---|---|
| 5,251,374 A | * | 10/1993 | Halstead ................ B23K 1/0012 228/183 |
| 5,477,919 A | * | 12/1995 | Karube ................. F28D 1/05391 165/176 |
| 6,220,343 B1 | * | 4/2001 | Ichiyanagi ............. F28D 1/0341 165/153 |
| 2001/0027860 A1 | * | 10/2001 | Watanabe ............. F28F 9/0246 165/178 |
| 2005/0061494 A1 | * | 3/2005 | Tsuji ........................ F28F 1/32 165/173 |

(Continued)

FOREIGN PATENT DOCUMENTS

JP H09-133491 A 5/1997

*Primary Examiner* — Claire E Rojohn, III
(74) *Attorney, Agent, or Firm* — Studebaker & Brackett PC

(57) ABSTRACT

A heat exchanger includes a tube expansion portion provided on a heat transfer tube such that an outer peripheral surface of the heat transfer tube is pressed against an inner peripheral surface of a first hole provided in a side wall portion of a case, and a first concave surface portion that is provided in a part of an outer surface of the tube expansion portion and forms a first gap, into which brazing material of a first brazed portion advances, between the outer surface of the tube expansion portion and the inner peripheral surface of the first hole. Thus, the attachment strength of the heat transfer tube can be improved by means of a simple configuration.

5 Claims, 6 Drawing Sheets

(56) References Cited

U.S. PATENT DOCUMENTS

| | | | |
|---|---|---|---|
| 2005/0167091 A1* | 8/2005 | Juschka | F28F 9/18 |
| | | | 165/173 |
| 2008/0264621 A1* | 10/2008 | Yoshino | F16L 21/035 |
| | | | 165/178 |
| 2014/0090827 A1* | 4/2014 | Iguchi | F28F 9/18 |
| | | | 165/176 |
| 2014/0332192 A1* | 11/2014 | Cosby, II | B23K 1/20 |
| | | | 165/177 |
| 2015/0176912 A1* | 6/2015 | Tsuji | B23K 9/167 |
| | | | 165/163 |
| 2016/0202001 A1* | 7/2016 | Eller | B23P 15/26 |
| | | | 165/157 |
| 2016/0377348 A1* | 12/2016 | Fujisawa | F28F 9/0202 |
| | | | 165/175 |
| 2017/0131043 A1* | 5/2017 | Contet | F28F 9/0224 |
| 2018/0245817 A1* | 8/2018 | Okuda | B21D 53/02 |
| 2018/0304339 A1* | 10/2018 | Ito | F28D 1/0426 |
| 2020/0103142 A1* | 4/2020 | Se | B21D 39/06 |
| 2020/0103182 A1* | 4/2020 | Hokada | B21D 39/06 |
| 2020/0306815 A1* | 10/2020 | Tsuji | B21D 39/20 |

\* cited by examiner

HEAT EXCHANGER AND MANUFACTURING METHOD THEREFOR

BACKGROUND OF THE INVENTION

Field of the Invention

The present invention relates to a heat exchanger used in a water heating application or the like in a water heater, for example, and a manufacturing method therefor.

Description of the Related Art

Japanese Patent Application Publication No. H09-133491 describes an example of a heat exchanger.

In the structure described in this document, an end portion of a heat transfer tube is inserted into a hole provided in a side wall portion of a case into which combustion gas is supplied. The end portion of the heat transfer tube is pressed against an inner peripheral surface of the hole by implementing tube expansion processing thereon. A part of the hole is formed into a tapered hole portion, and in so doing, a concave portion into which brazing material can advance is formed between the inner peripheral surface of the hole and an outer peripheral surface of the heat transfer tube. The heat transfer tube and an attachment subject member are brazed by the brazing material.

According to this configuration, both tube expansion of the heat transfer tube and brazing are employed, and as a result, the heat transfer tube can be fixed to the side wall portion of the case with a comparatively high degree of strength.

As described below, however, there remains room for improvement in the prior art described above.

In the prior art described above, a part of the hole provided in the side wall portion of the case is formed into a tapered hole portion as means for increasing the strength with which the heat transfer tube is brazed to the side wall portion. Hence, the processing for providing the tapered hole portion is complicated, leading to an increase in manufacturing cost. Moreover, when a part of the hole is formed into a tapered hole portion, a contact area between the inner peripheral surface of the hole and the outer peripheral surface of the heat transfer tube decreases correspondingly. Therefore, when the heat transfer tube is expanded, it is difficult to increase the pressing force of the heat transfer tube against the inner peripheral surface of the hole, leading to a reduction in the attachment strength of the heat transfer tube. This problem becomes even more noticeable when the side wall portion is thin.

Further, even though a part of the hole is formed into the tapered hole portion and this part is filled with brazing material, an inner peripheral surface of the tapered hole portion and the outer peripheral surface of the heat transfer tube remain apart from each other by a comparatively large dimension. Hence, the brazing strength of the heat transfer tube within the tapered hole portion is likewise insufficient.

CITATION LIST

Patent Literature 1: Japanese Patent Application Publication No. H09-133491

SUMMARY OF THE INVENTION

An object of the present invention is to provide a heat exchanger with which the problems described above can be eliminated or suppressed as appropriate, and a manufacturing method therefor.

To solve the problems described above, the present invention employs the following technical means.

A heat exchanger provided by a first aspect of the present invention includes a case into which a heating medium is supplied, a heat transfer tube drawn out to the outside from the interior of the case by inserting an end portion thereof into a first hole provided in a side wall portion of the case, a first brazed portion provided on the side wall portion to bond the heat transfer tube to a peripheral edge portion of the first hole, a tube expansion portion provided on the heat transfer tube such that an outer peripheral surface of the heat transfer tube is pressed against an inner peripheral surface of the first hole, and a first concave surface portion that is provided in a part of an outer surface of the tube expansion portion and forms a first gap, into which brazing material of the first brazed portion advances, between the outer surface of the tube expansion portion and the inner peripheral surface of the first hole.

Preferably, the tube expansion portion includes first and second step portions that are positioned respectively on the inside and the outside of the side wall portion so as to sandwich the side wall portion in an axial length direction of the heat transfer tube, and bonded to the side wall portion, and the first concave surface portion extends to respective outer surfaces of the first and second step portions.

The heat exchanger according to the present invention preferably includes a plurality of first concave surface portions as the first concave surface portion.

The heat exchanger according to the present invention preferably includes a header portion provided with a second hole, into which the end portion of the heat transfer tube is inserted, and bonded to the end portion of the heat transfer tube via a second brazed portion, wherein the tube expansion portion is provided such that an outer peripheral surface of the end portion of the heat transfer tube is also pressed against an inner peripheral surface of the second hole, and the heat exchanger further includes a second concave surface portion that is provided in a part of the outer surface of the tube expansion portion and forms a second gap, into which brazing material of the second brazed portion advances, between the outer surface of the tube expansion portion and the inner peripheral surface of the second hole.

Preferably, the header portion includes a base portion in which the second hole is provided, and a cover portion provided with an opening, which is used as a water inlet or a hot water outlet, and bonded to the base portion, and a chamber that communicates with the interior of the heat transfer tube is formed inside the base portion and the cover portion.

The heat exchanger according to the present invention preferably includes a plurality of second concave surface portions as the second concave surface portion.

A manufacturing method for a heat exchanger provided by a second aspect of the present invention includes a tube expansion step for providing a tube expansion portion on a heat transfer tube in a state where an end portion of the heat transfer tube is inserted into a first hole provided in a side wall portion of a case, into which a heating medium is supplied, such that an outer peripheral surface of the heat transfer tube is pressed against an inner peripheral surface of the first hole, and a brazing step for providing a first brazed portion on the side wall portion in order to bond the heat transfer tube to a peripheral edge portion of the first hole, wherein the tube expansion step is performed using a divided punch having an expandable and contractable portion capable of expanding and contracting in a radial direction of the heat transfer tube while inserted into the heat transfer tube, the expandable and contractable portion includes a plurality of segments for pressing the heat transfer tube from the inside, the plurality of segments being configured such that during expansion of the heat transfer tube, separating portions are formed between respective outer surface portions of the plurality of segments, and using the separating portions, first concave surface portions are provided in parts of an outer surface of the tube expansion portion in order to form first gaps between the outer surface and the inner peripheral surface of the first hole, and in the brazing step, molten brazing material of the first brazed portion is caused to advance into the first gaps.

Preferably, beveled portions are provided on end edges of the respective outer surface portions of the plurality of segments in order to enlarge widths of the separating portions.

The manufacturing method for a heat exchanger according to the present invention preferably further includes a header portion attachment step for brazing a header portion to the end portion of the heat transfer tube, wherein, in the header portion attachment step, prior to the tube expansion step, the end portion of the heat transfer tube is inserted into a second hole provided in the header portion, in the tube expansion step, the tube expansion portion is provided such that an outer peripheral surface of the end portion of the heat transfer tube is also pressed against an inner peripheral surface of the second hole, and second concave surface portions are provided in parts of the outer surface of the tube expansion portion so as to form second gaps between the outer surface and the inner peripheral surface of the second hole, and in the brazing step, a second brazed portion is provided on a peripheral edge portion of the second hole in order to bond the end portion of the heat transfer tube thereto, and molten brazing material of the second brazed portion is caused to advance into the second gaps.

Other features and advantages of the present invention will become more apparent from the embodiments of the invention to be described below with reference to the attached figures.

DETAILED DESCRIPTION OF THE PREFERRED EMBODIMENTS

Preferred embodiments of the present invention will be described specifically below with reference to the figures.

A heat exchanger HE shown in FIGS. 1 to 3B is incorporated into a water heater, for example, and used to heat water to be heated for use in a hot water supply. The heat exchanger HE includes a substantially rectangular frame-shaped case 1 that is open at the top and bottom, a plurality of heat transfer tubes 2 housed therein, and water inlet and hot water outlet header portions 6 attached to the plurality of heat transfer tubes 2.

Although not shown in the figure, the heat exchanger HE is used to recover latent heat in a so-called reverse combustion type water heater, in which a burner for generating combustion gas (an example of a heating medium) and a separate heat exchanger for recovering sensible heat from the combustion gas are installed above the case 1. The heat exchanger HE is used to additionally recover latent heat from the combustion gas that has passed through the separate heat exchanger. Water to be heated passing through the plurality of heat transfer tubes 2 is heated using the combustion gas.

Figure 1:
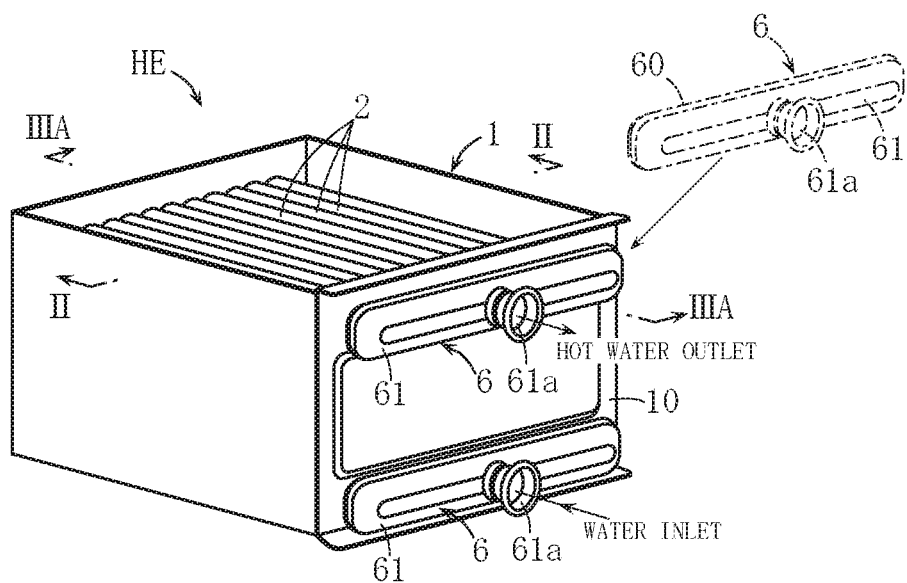
FIG. 1 is a perspective view showing an example of a heat exchanger according to the present invention.
Figure 2:
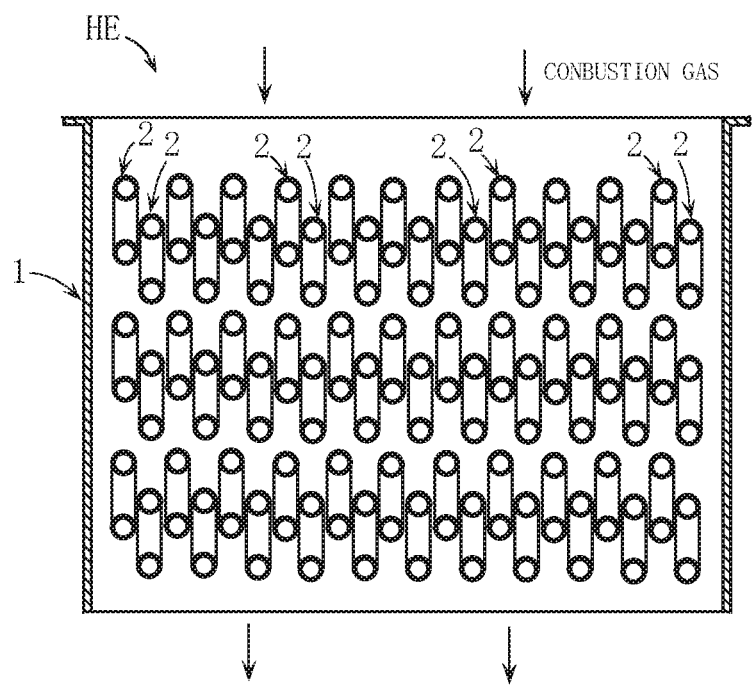
FIG. 2 is a II-II sectional view of FIG. 1.
Figure 3A:
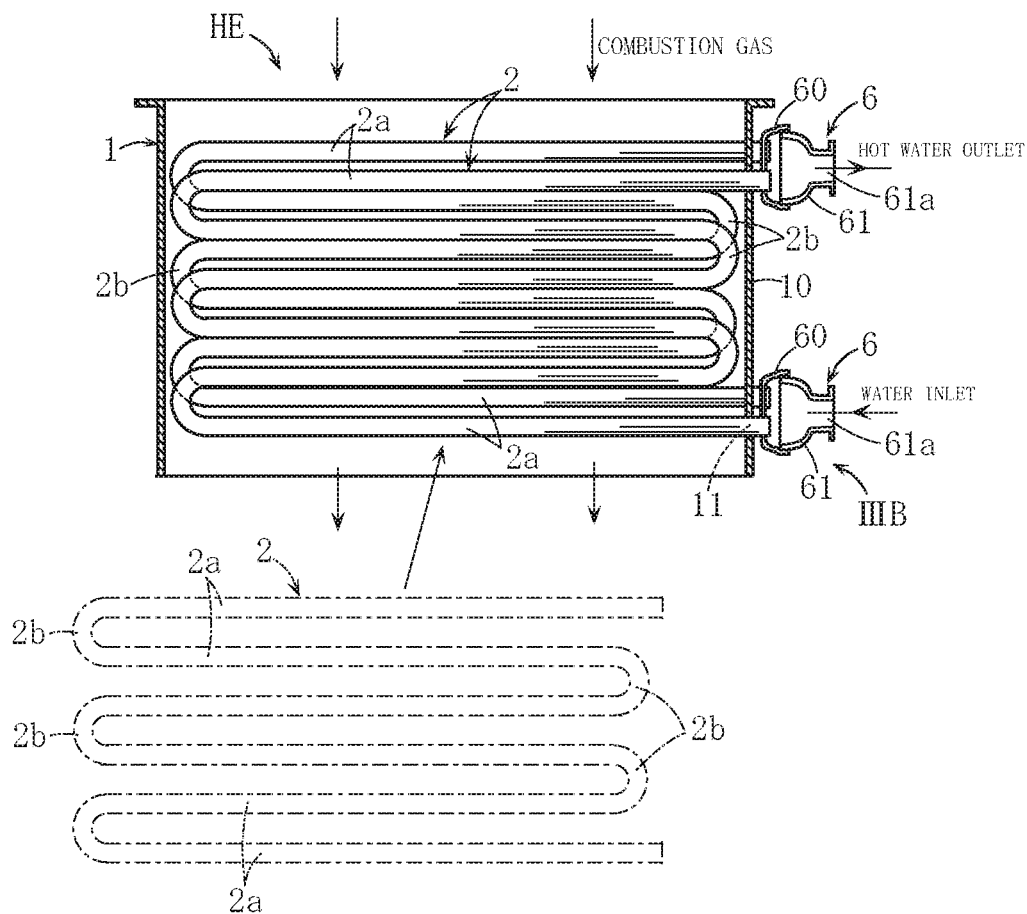
FIG. 3A is a IIIA-IIIA sectional view of FIG. 1.

Each heat transfer tube 2 is a meandering heat transfer tube, and as is evident from FIG. 3A, the heat transfer tube 2 is formed by connecting a plurality of linear tube body portions 2a arranged with gaps therebetween in series via connecting tube body portions 2b having a semicircular arc shape or the like. The heat transfer tubes 2 are respectively set in an erect attitude with the plurality of linear tube body portions 2a arranged in a vertical height direction, and then arranged in a lateral width direction of the case 1, as shown in FIG. 2. Note, however, that the plurality of heat transfer tubes 2 are provided in a staggered arrangement such that a height difference exists between adjacent heat transfer tubes 2. This configuration is effective in increasing the amount of heat recovered from the combustion gas by the plurality of heat transfer tubes 2.

Figure 3B:
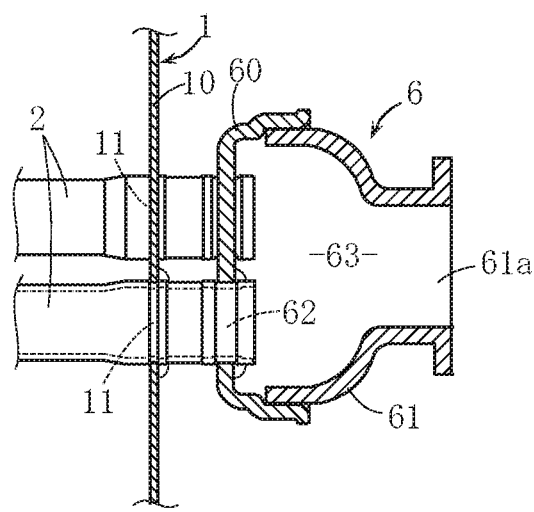
FIG. 3B is an enlarged view of a IIIB portion of FIG. 3A.

As shown in FIGS. 3A and 3B, respective end portions of the heat transfer tubes 2 are drawn out to the outside from the interior of the case 1 by being inserted into first holes 11 provided in a side wall portion 10 of the case 1. Each header portion 6 is formed by bonding a base portion 60 to a cover portion 61 having an opening 61a used as a water inlet or a hot water outlet, and forming a chamber 63 that communicates with the heat transfer tubes 2 in the interior thereof.

In this embodiment, a structure for fixing the heat transfer tube 2 to the side wall portion 10 and a structure for attaching the header portion 6 to the heat transfer tube 2 are featured structures and will therefore be described below.

Figure 4A:
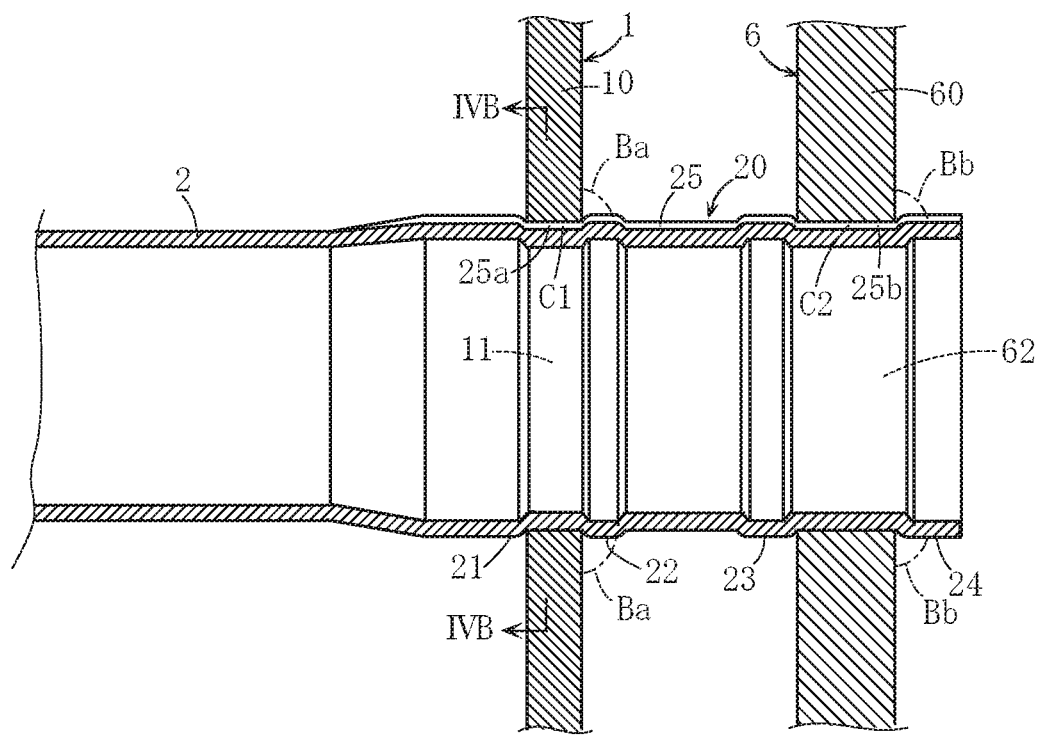
FIG. 4A is an enlarged sectional view showing the main parts of the heat exchanger shown in FIGS. 1 to 3B.

In FIG. 4A, the heat transfer tube 2 is provided with a tube expansion portion 20. A first brazed portion Ba is provided as means for bonding the heat transfer tube 2 to the side wall portion 10 of the case 1.

Figure 4B:
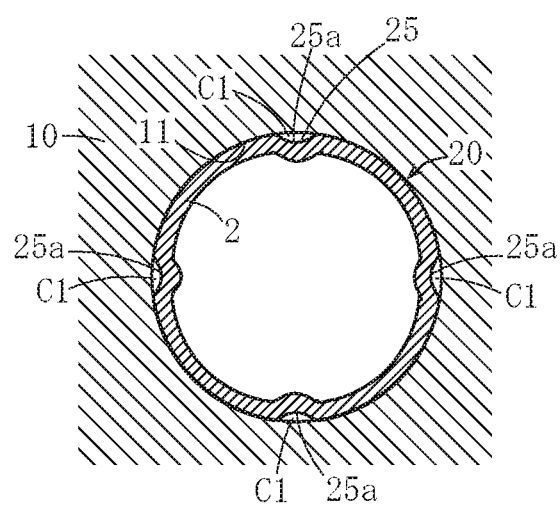
FIG. 4B is an IVB-IVB sectional view of FIG. 4A.

The tube expansion portion 20 is provided on the heat transfer tube 2 from a position further inward than the side wall portion 10 of the case 1 to a tip end portion, and includes first to fourth step portions 21 to 24 and a plurality of concave surface portions 25 including first and second concave surface portions 25a, 25b. The plurality of concave surface portions 25 are sites corresponding to separating portions 55 of a divided punch 5 used in a tube expansion operation, to be described with reference to FIGS. 5A to 5C, and as shown in FIG. 4B, the plurality of concave surface portions 25 are provided at appropriate intervals in a circumferential direction of the heat transfer tube 2 (to facilitate understanding, FIG. 4A shows a state in which the concave surface portions 25 are provided on an upper portion of the heat transfer tube 2 but not provided on a lower portion; this point applies similarly to FIG. 8A, to be described below). The concave surface portions 25 correspond respectively to unexpanded portions and extend in an axial length direction of the heat transfer tube 2.

The first and second step portions 21, 22 are parts positioned respectively on the inside and the outside of the side wall portion 10 of the case 1 so as to sandwich the side wall portion 10 in the axial length direction of the heat transfer tube 2 and configured to have a larger diameter than an outer diameter of the unexpanded portions of the heat transfer tube 2. The first and second step portions 21, 22 are preferably disposed in contact with both the inside and outside surfaces of the side wall portion 10.

As shown in FIG. 4B, an outer peripheral surface of the tube expansion portion 20 (an outer peripheral surface of a region between the first and second step portions 21, 22) is pressed against an inner peripheral surface of the first hole 11. Note, however, that in the positions of the first concave surface portion 25a, the outer peripheral surface of the tube expansion portion 20 and the inner peripheral surface of the first hole 11 are not in contact, and first gaps C1 are formed therebetween. Parts of the concave surface portions 25 opposing the inner peripheral surface of the first hole 11 respectively form the first concave surface portions 25a. The first concave surface portions 25a also extend to formation locations of the first and second step portions 21, 22.

The first brazed portion Ba is a part of the side wall portion 10 for bonding a peripheral edge portion of the first hole 11 to an outer peripheral surface of the heat transfer tube 2, and is provided on the outside of the side wall portion 10. Note that some of the brazing material of the first brazed portion Ba advances into the first gaps C1 so as to bond the inner peripheral surface of the first hole 11 to the outer peripheral surface of the heat transfer tube 2. Preferably, some of the brazing material reaches the inner surface side of the side wall portion 10 through the first gap C1 so as to form brazed portions (not shown) for bonding the inner surface side of the side wall portion 10 to the heat transfer tube 2.

A part of the heat transfer tube 2 near the tip end is inserted into a second hole 62 provided in the base portion 60 of the header portion 6, and a second brazed portion Bb is provided as means for bonding these parts. The third and fourth step portions 23, 24 of the tube expansion portion 20 are parts positioned respectively on the inside and the outside of the base portion 60 in the axial length direction of the heat transfer tube 2 and configured to have a larger diameter than the outer diameter of the unexpanded portions of the heat transfer tube 2. The third and fourth step portions 23, 24 are preferably disposed in contact with both inside and outside surfaces of the base portion 60.

The outer peripheral surface of the tube expansion portion 20 is also pressed against an inner peripheral surface of the second hole 62 (see the lower side part of the region near the tip end of the heat transfer tube 2 in FIG. 4A). Note, however, that in formation locations of the second concave surface portions 25b, the outer peripheral surface of the tube expansion portion 20 and the inner peripheral surface of the second hole 62 are not in contact, and second gaps C2 are formed therebetween. Parts of the concave surface portions 25 opposing the inner peripheral surface of the second hole 62 respectively form the second concave surface portions 25b. The second concave surface portions 25b also extends to formation locations of the third and fourth step portions 23, 24.

The second brazed portion Bb is a part of the base portion 60 for bonding a peripheral edge portion of the second hole 62 to the outer peripheral surface of the heat transfer tube 2, and is provided on one surface side of the base portion 60. Note that some of the brazing material of the second brazed portion Bb advances into the second gaps C2 so as to bond the inner peripheral surface of the second hole 62 to the outer peripheral surface of the heat transfer tube 2. Although not shown in the figures, preferably, some of the brazing material reaches the opposite surface side of the base portion 60 to the aforesaid surface side through the second gaps C2 so as to form brazed portions (not shown) for bonding the opposite surface side of the base portion 60 to the heat transfer tube 2.

Next, an example of a method for manufacturing the above heat exchanger HE will be described.

Figure 5A:
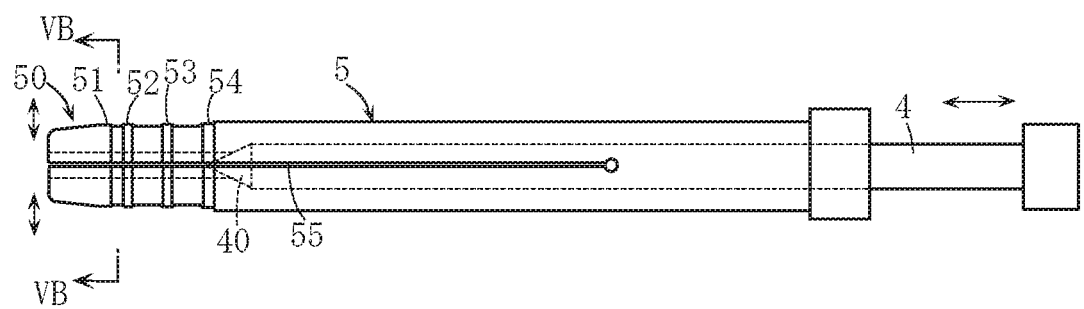
FIG. 5A is a front view showing an example of a divided punch used to expand a heat transfer tube.
Figure 5B:
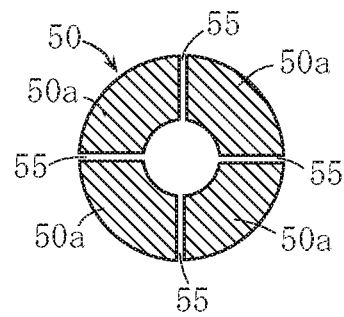
FIG. 5B is a VB-VB sectional view of FIG. 5A.
Figure 5C:
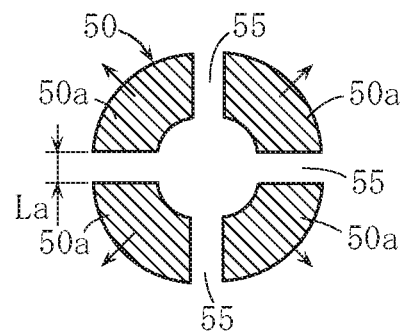
FIG. 5C is a sectional view showing the main parts of an action performed by the structure shown in FIG. 5B.

The divided punch 5 shown in FIGS. 5A to 5C is used to manufacture the heat exchanger HE. To facilitate understanding, the divided punch 5 will be described first.

The divided punch 5 is formed in a tubular shape with a mandrel 4 inserted into the interior thereof and includes a plurality of slits 55 (the separating portions) extending from a tip end portion toward a base end portion side. As a result, the divided punch 5 is divided into a plurality of (four, for example) segments 50a about the central axis thereof, and a part of the divided punch 5 near the axial length direction tip end serves as an expandable and contractable portion 50 capable of expanding and contracting in a radial direction. First to fourth convex portions 51 to 54 for forming the first to fourth step portions 21 to 24 described above are provided on an outer peripheral surface of the expandable and contractable portion 50.

A tip end portion of the mandrel 4 serves as a wedge portion 40 that is formed in a conical shape a pyramid shape, or the like, for example, and has a diameter or a width that increases gradually from the tip end portion to the base end portion side, and is positioned inside the expandable and contractable portion 50 of the divided punch 5. When the mandrel 4 is inserted relative to the divided punch 5, the expandable and contractable portion 50 shifts from an unexpanded state shown in FIG. 5B to an expanded state shown in FIG. 5C. In other words, the plurality of segments 50a can be pushed out by the wedge portion 40. In the expanded state shown in FIG. 5C, a width La of the slits 55 (the separating portions) increases, and as a result, the plurality of concave surface portions 25 can be formed in the tube expansion portion 20 of the heat transfer tube 2.

When manufacturing the heat exchanger HE, the divided punch 5 described above is used to implement procedures such as those shown in FIGS. 6A to 8B.

Figure 6A:
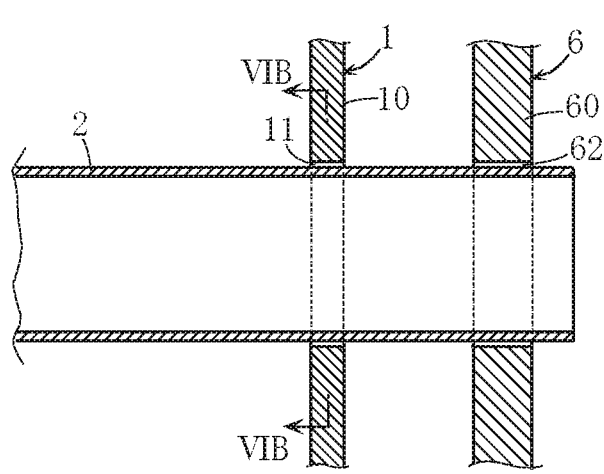
FIG. 6A is a sectional view showing main parts of example operation processes of a manufacturing method for the heat exchanger shown in FIGS. 1 to 3B.
Figure 6B:
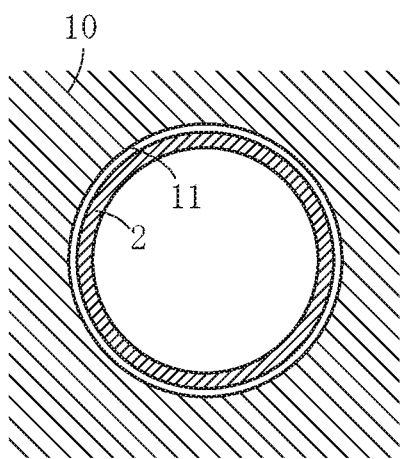
FIG. 6B is a VIB-VIB sectional view of FIG. 6A.
Figure 7A:
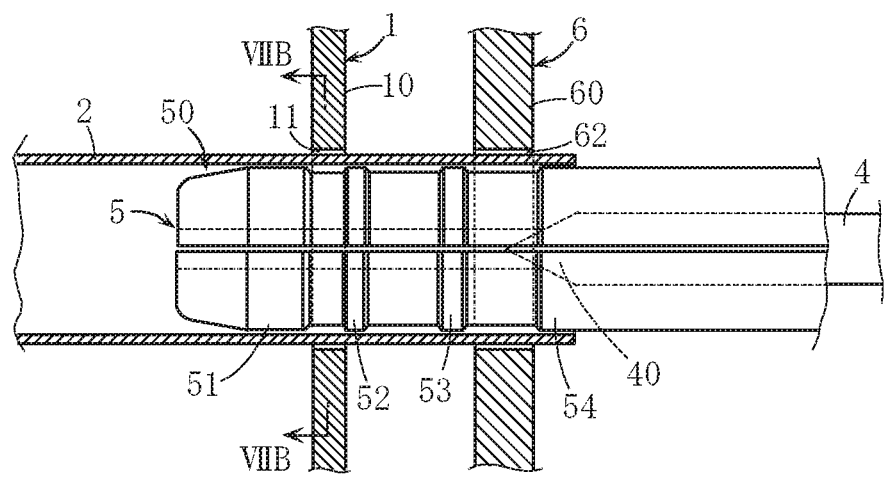
FIG. 7A is a sectional view showing main parts of example operation processes of the manufacturing method for the heat exchanger shown in FIGS. 1 to 3B.
Figure 7B:
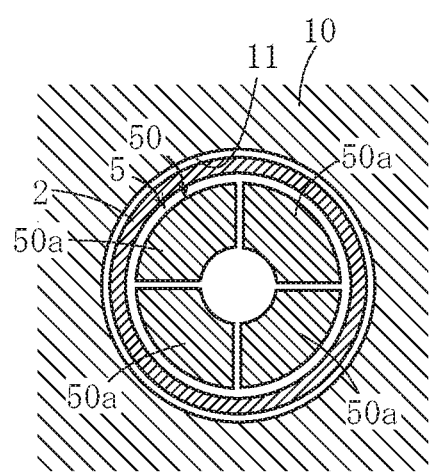
FIG. 7B is a VIIB-VIIB sectional view of FIG. 7A.
Figure 8A:
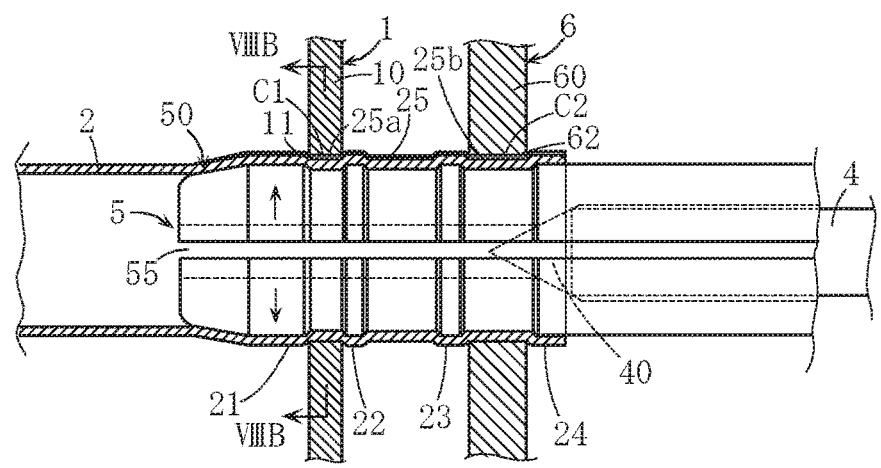
FIG. 8A is a sectional view showing main parts of example operation processes of the manufacturing method for the heat exchanger shown in FIGS. 1 to 3B.
Figure 8B:
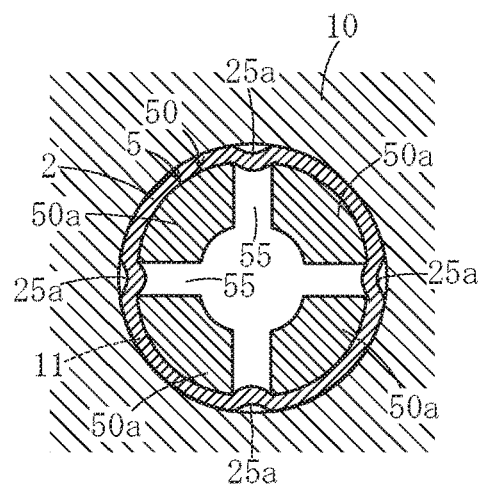
FIG. 8B is a VIIIB-VIIIB sectional view of FIG. 8A.

First, in a state where the heat transfer tube 2 is inserted into the first and second holes 11, 62 provided respectively in the side wall portion 10 of the case 1 and the base portion 60 of the header portion 6, as shown in FIGS. 6A and 6B, the divided punch 5 is inserted into the heat transfer tube 2, as shown in FIGS. 7A and 7B. Next, as shown in FIGS. 8A and 8B, the divided punch 5 is expanded in order to expand the region near the end portion of the heat transfer tube 2. In so doing, the tube expansion portion 20 described with reference to FIGS. 4A and 4B can be provided on the heat transfer tube 2. Moreover, the heat transfer tube 2 can be fixed provisionally to the side wall portion 10 and the base portion 60 can be fixed provisionally to the heat transfer tube 2 appropriately.

As is evident from FIG. 8B, when the expandable and contractable portion 50 of the divided punch 5 is expanded, the width of the slits 55 (the separating portions) between the plurality of segments 50a increases such that locations corresponding to the slits 55 are either not expanded or substantially not expanded in comparison with other parts. As a result, the plurality of concave surface portions 25 can be provided in the tube expansion portion 20.

Once the tube expansion process described above is complete, a brazing process is implemented to provide the first and second brazed portions Ba, Bb. In the brazing process, predetermined brazing target sites are coated with the brazing material, whereupon the brazing material is heated and melted in a heating furnace. At this time, some of the melted brazing material for forming the first and second brazed portions Ba, Bb advances into the first and second gaps C1, C2.

By implementing the series of processes described above, the heat exchanger HE can be manufactured appropriately.

With the heat exchanger HE according to this embodiment, the following effects are obtained.

The plurality of first gaps C1 are formed between the inner peripheral surface of the first hole 11 provided in the side wall portion 10 of the case 1 and the outer peripheral surface of the heat transfer tube 2, and the brazing material of the first brazed portion Ba advances into the first gaps C1. Thus, the brazed area between the side wall portion 10 and the heat transfer tube 2 can be increased. Moreover, the brazing material can be caused to move around to the inner surface side of the side wall portion 10. As a result, the strength with which the heat transfer tube 2 is brazed to the side wall portion 10 can be increased.

The plurality of first concave surface portions 25a are provided in the outer surface of the tube expansion portion 20 as means for increasing the brazed area between the side wall portion 10 and the heat transfer tube 2, but the plurality of first concave surface portions 25a are provided in parts of the circumferential direction of the tube expansion portion 20 such that the contact area (the surface area of the pressing region) between the outer peripheral surface of the heat transfer tube 2 and the inner peripheral surface of the first hole 11 can be increased. Hence, the strength by which the heat transfer tube 2 is attached to the side wall portion 10 as a result of the tube expansion can also be increased.

The first hole 11 in the side wall portion 10 may be a simple straight hole, and it is not necessary to form a part thereof into a tapered hole portion, for example. Meanwhile, the plurality of first concave surface portions 25a are provided in the tube expansion portion 20 of the heat transfer tube 2, but the plurality of first concave surface portions 25a can also be provided simply using the slits 55 (the separating portions of the plurality of segments 50a) of the divided punch 5.

The attachment strength of the heat transfer tube 2 relative to the side wall portion 10 is further enhanced by the existence of the first and second step portions 21, 22. Meanwhile, the first concave surface portions 25a extend to the first and second step portions 21, 22, and therefore the brazing material of the first brazed portion Ba can be caused to advance smoothly into the first gaps C1 through the extending parts of the first concave surface portions 25a. Inadvertent blockage of the first gaps C1 by the first and second step portions 21, 22 can thus be avoided appropriately.

The structure for attaching the header portion 6 (the base portion 60) to the heat transfer tube 2 has a similar basic configuration to the structure for attaching the heat transfer tube 2 to the side wall portion 10, and therefore the brazing strength of the header portion 6 and the fixing strength achieved by tube expansion can both be increased. The tube expansion process for attaching the header portion 6 to the heat transfer tube 2 can be performed simultaneously with the tube expansion process described above for attaching the heat transfer tube 2 to the side wall portion 10. As a result, the operation to manufacture the heat exchanger HE can be performed easily, and the manufacturing cost can be reliably reduced.

Figure 9:
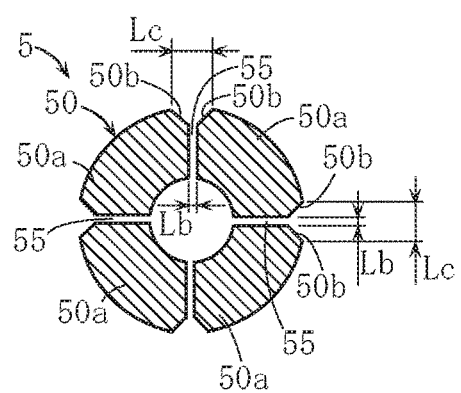
FIG. 9 is a sectional view showing the main parts of another embodiment of the present invention.

FIG. 9 shows another embodiment of the plurality of segments 50a of the divided punch 5 used in the manufacturing method of the present invention. In the embodiment shown in the figure, a beveled portion 50b is provided on an end edge of the outer surface portion of each of the plurality of segments 50a.

According to this configuration, a width Lc of the separating portions 55 (the slits) in the plurality of segments 50a is larger than the original width Lb. Therefore, when the heat transfer tube 2 is expanded, as shown in FIGS. 8A and 8B, the size of the concave surface portions 25 can be increased and optimized. Moreover, the concave surface portions 25 can be formed more reliably.

The present invention is not limited to the content of the embodiments described above, and the specific configurations of the respective parts of the heat exchanger according to the present invention may be freely subjected to various design modifications within the intended scope of the present invention. The specific configurations of the respective processes of the manufacturing method for a heat exchanger according to the present invention may be modified freely within the intended scope of the present invention.

The heat transfer tube is not limited to a meandering shape, and a tube body having a U shape, a straight tube shape, a spiral shape, or the like, for example, may be used instead. There are no limitations on the specific shape of the heat transfer tube. A tube body having an elliptical cross-section or the like may also be used.

The heat exchanger according to the present invention is not limited to a so-called reverse combustion system and may employ a so-called normal combustion system (a system in which the burner is disposed on the lower side of the heat exchanger and the combustion gas is caused to advance upward), for example, instead. The heat exchanger is not limited to use in a water heater.

The heating medium is not limited to combustion gas, and high-temperature exhaust gas generated in a cogeneration system or the like, for example, may be used instead.

The plurality of segments of the divided punch used in the manufacturing method for a heat exchanger according to the present invention are not limited to being divided by slits, and instead, the plurality of segments may be respectively formed from separate members.

The invention claimed is:

1. A heat exchanger comprising:
   a case into which a heating medium is supplied;
   a heat transfer tube drawn out to an outside from an interior of the case such that an end portion of the heat transfer tube is inserted into a first hole provided in a side wall portion of the case;
   a first brazed portion provided on the side wall portion to bond the heat transfer tube to a peripheral edge portion of the first hole;

a tube expansion portion provided on the heat transfer tube such that an outer peripheral surface of the heat transfer tube is pressed against an inner peripheral surface of the first hole; and a first concave surface portion that is provided in a part of an outer surface of the tube expansion portion and forms a first gap, into which brazing material of the first brazed portion advances, between the outer surface of the tube expansion portion and the inner peripheral surface of the first hole, wherein the tube expansion portion includes first and second step portions that are positioned respectively on the inside and the outside of the side wall portion so as to sandwich the side wall portion in an axial length direction of the heat transfer tube, and bonded to the side wall portion, and the first concave surface portion extends to respective outer surfaces of the first and second step portions.

2. The heat exchanger according to claim 1, wherein a plurality of first concave surface portions are provided as the first concave surface portion.

3. The heat exchanger according to claim 1, comprising a header portion provided with a second hole, into which the end portion of the heat transfer tube is inserted, and bonded to the end portion of the heat transfer tube via a second brazed portion, wherein the tube expansion portion is provided such that an outer peripheral surface of the end portion of the heat transfer tube is also pressed against an inner peripheral surface of the second hole, and the heat exchanger further comprises a second concave surface portion that is provided in a part of the outer surface of the tube expansion portion and forms a second gap, into which brazing material of the second brazed portion advances, between the outer surface of the tube expansion portion and the inner peripheral surface of the second hole.

4. The heat exchanger according to claim 3, wherein the header portion includes a base portion in which the second hole is provided, and a cover portion provided with an opening that is used as a water inlet or a hot water outlet and bonded to the base portion, and a chamber that communicates with the interior of the heat transfer tube is formed inside the base portion and the cover portion.

5. The heat exchanger according to claim 3, wherein a plurality of second concave surface portions are provided as the second concave surface portion.

* * * * *